(12) United States Patent
Valenzuela et al.

(10) Patent No.: US 12,521,569 B2
(45) Date of Patent: Jan. 13, 2026

(54) RADIATION TREATMENT APPARATUS AND METHOD

(71) Applicant: Siemens Healthineers International AG, Steinhausen (CH)

(72) Inventors: Daniel Valenzuela, Helsinki (FI); Jarkko Peltola, Tuusula (FI); Esa Kuusela, Espoo (FI); Tuomas Tallinen, Espoo (FI)

(73) Assignee: Siemens Healthineers International AG, Steinhausen (CH)

( * ) Notice: Subject to any disclaimer, the term of this patent is extended or adjusted under 35 U.S.C. 154(b) by 265 days.

(21) Appl. No.: 18/192,935

(22) Filed: Mar. 30, 2023

(65) Prior Publication Data

US 2024/0325784 A1    Oct. 3, 2024

(51) Int. Cl.
*A61N 5/10*   (2006.01)
*G16H 20/40*   (2018.01)
*G16H 40/60*   (2018.01)

(52) U.S. Cl.
CPC .......... *A61N 5/1031* (2013.01); *G16H 20/40* (2018.01); *G16H 40/60* (2018.01)

(58) Field of Classification Search
CPC .... A61N 5/1031; A61N 5/1047; A61N 5/103; G16H 20/40; G16H 40/60
See application file for complete search history.

(56) References Cited

U.S. PATENT DOCUMENTS

| 7,773,723 | B2 | 8/2010 | Nord |
| 8,009,804 | B2 | 8/2011 | Siljamaki |
| 2006/0285639 | A1* | 12/2006 | Olivera ................ A61N 5/1042 378/65 |
| 2012/0123184 | A1* | 5/2012 | Otto ..................... A61N 5/1067 600/1 |
| 2018/0085596 | A1 | 3/2018 | Peltola |

(Continued)

FOREIGN PATENT DOCUMENTS

CN    111437521 A    7/2020

OTHER PUBLICATIONS

Yoosuf, Ab Mohamed et al.; Investigation of optimum minimum segment width on VMAT plan quality and deliverability: A comprehensive dosimetric and clinical evaluation using DVH analysis; J Appl Clin Med Phys. 2021; 22 (11):29-40. https://doi:10.1002/acm2.13417.

(Continued)

*Primary Examiner* — Kiho Kim
(74) *Attorney, Agent, or Firm* — Fitch, Even, Tabin & Flannery LLP (57) ABSTRACT

A control circuit accesses information regarding a given patient. That information may include, for example, segmentation information that depicts at least one treatment volume and at least one organ-at-risk. The control circuit then defines a plurality of dose-calculation sectors for the given patient as a function, at least in part, of the information regarding the given patient. Those dose-calculation sectors are not assumed to be uniformly sized. These teachings can then provide for optimizing a radiation treatment plan, such as a volumetric modulated arc therapy radiation treatment plan, as a function, at least in part, of the plurality of dose-calculation sectors to provide an optimized radiation treatment plan.

20 Claims, 4 Drawing Sheets

(56) References Cited

U.S. PATENT DOCUMENTS

2018/0154179 A1 6/2018 Ollila
2019/0076671 A1 3/2019 Willcut
2021/0252307 A1 8/2021 Kontaxis
2021/0353963 A1 11/2021 Zhou
2022/0118283 A1 4/2022 Ranganathan

OTHER PUBLICATIONS

International Search Report from related Application No. PCT/EP2024/058593, dated Jun. 7, 2024; 4 pages.

* cited by examiner

Prior Art

RADIATION TREATMENT APPARATUS AND METHOD

TECHNICAL FIELD

These teachings relate generally to treating a patient's planning target volume with energy pursuant to an energy-based treatment plan and more particularly to optimizing an energy-based treatment plan.

BACKGROUND

The use of energy to treat medical conditions comprises a known area of prior art endeavor. For example, radiation therapy comprises an important component of many treatment plans for reducing or eliminating unwanted tumors. Unfortunately, applied energy typically does not inherently discriminate between unwanted material and adjacent tissues, organs, or the like that are desired or even critical to continued survival of the patient. As a result, energy such as radiation is ordinarily applied in a carefully administered manner to at least attempt to restrict the energy to a given target volume. A so-called radiation treatment plan often serves in the foregoing regards.

A radiation treatment plan typically comprises specified values for each of a variety of treatment-platform parameters during each of a plurality of sequential fields that typically each have a corresponding so-called control point. Treatment plans for radiation treatment sessions are often automatically generated through a so-called optimization process. As used herein, "optimization" will be understood to refer to improving a candidate treatment plan without necessarily ensuring that the optimized result is, in fact, the singular best solution. Such optimization often includes automatically adjusting one or more physical treatment parameters (often while observing one or more corresponding limits in these regards) and mathematically calculating a likely corresponding treatment result (such as a level of dosing) to identify a given set of treatment parameters that represent a good compromise between the desired therapeutic result and avoidance of undesired collateral effects.

Volumetric modulated arc therapy (VMAT) is a particular radiation therapy technique in which the gantry that supports the radiation source rotates during the treatment session to thereby move the radiation source from one field/control point to the next around an arcuate pathway. Treatment plan optimization of such plans typically involves a number of free variables that can be modified, including gantry angles, individual leaf positions for one or more multi-leaf collimators, monitor unit levels, and so forth. The search space for all possible configurations is huge, making direct optimization of the control points unfeasible in practice. Furthermore, optimization of VMAT plans is known to be a non-convex problem, so efficient exploration of the search space is important to avoid plans that are only locally optimal, but significantly inferior to a global optimum.

BRIEF DESCRIPTION OF THE DRAWINGS

The above needs are at least partially met through provision of the radiation treatment apparatus and method described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments, a control circuit accesses information regarding a given patient. That information may include, for example, segmentation information that depicts at least one treatment volume and at least one organ-at-risk. The control circuit then defines a plurality of dose-calculation sectors for the given patient as a function, at least in part, of the information regarding the given patient. Those dose-calculation sectors are not required to be uniformly sized. These teachings can then provide for optimizing a radiation treatment plan, such as a volumetric modulated arc therapy radiation treatment plan, as a function, at least in part, of the plurality of dose-calculation sectors to provide an optimized radiation treatment plan.

By one approach, defining the plurality of dose-calculation sectors for the given patient comprises, at least in part, defining the dose-calculation sectors such that each organ-at-risk is at least substantially wholly contained within a single one of the dose-calculation sectors.

By another approach, in lieu of the foregoing or in combination therewith, defining the plurality of dose-calculation sectors for the given patient comprises, at least in part, defining only two types of dose-calculation sectors, comprising a first type of dose-calculation sector that wholly contains at least one organ-at-risk, and a second type of dose-calculation sector that does not contain any part of any organ-at-risk. In such a case, defining the plurality of dose-calculation sectors for the given patient can further comprise, at least in part, defining at least one of the second type of dose-calculation sectors between any two otherwise adjacent ones of the first type of dose-calculation sectors.

By one approach, these teachings will accommodate defining the plurality of dose-calculation sectors for the given patient by, at least in part, sizing at least some of the plurality of dose-calculation sectors that contain a corresponding organ-at-risk to be right-sized to thereby accommodate that corresponding organ-at-risk.

By one approach, defining the plurality of dose-calculation sectors for the given patient comprises, at least in part, sizing at least some of the dose-calculation sectors as a function of at least one complexity metric such that defined dose-calculation sectors correspond to reduced optimization complexity.

By one approach, defining the plurality of dose-calculation sectors for the given patient comprises, at least in part, allowing a given dose-calculation sector to range from a specified minimum number of control points to a specified maximum number of control points.

So configured, the sizes of dose-calculation sectors for a given radiation treatment plan can be different from one another. Freeing this constraint, in turn, permits the calculation of optimal sizes for at least some, and preferably all, dose-calculation sectors for each radiation treatment plan, wherein that calculation can be based on particular features of the plan being optimized.

Figure 1:
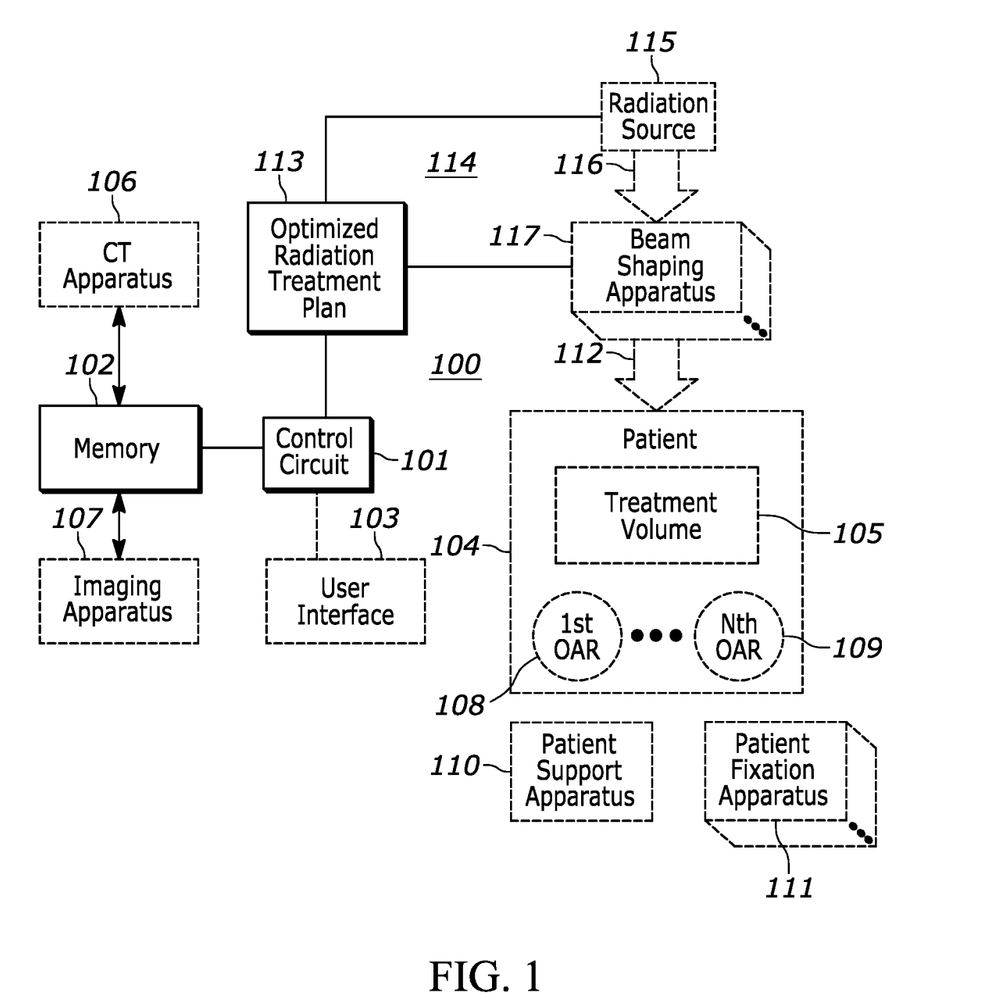
FIG. 1 comprises a block diagram as configured in accordance with various embodiments of these teachings.

These and other benefits may become clearer upon making a thorough review and study of the following detailed description. Referring now to the drawings, and in particular to FIG. 1, an illustrative apparatus 100 that is compatible with many of these teachings will first be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

The control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to information such as optimization information (including segmentation information) for a particular patient and information regarding a particular radiation treatment platform as described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach the control circuit 101 also operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

If desired the control circuit 101 can also operably couple to a network interface (not shown). So configured the control circuit 101 can communicate with other elements (both within the apparatus 100 and external thereto) via the network interface. Network interfaces, including both wireless and non-wireless platforms, are well understood in the art and require no particular elaboration here.

By one approach, a computed tomography apparatus 106 and/or other imaging apparatus 107 as are known in the art can source some or all of any desired patient-related imaging information.

In this illustrative example the control circuit 101 is configured to ultimately output an optimized energy-based treatment plan (such as, for example, an optimized radiation treatment plan 113). This energy-based treatment plan typically comprises specified values for each of a variety of treatment-platform parameters during each of a plurality of sequential exposure fields. In this case the energy-based treatment plan is generated through an optimization process, examples of which are provided further herein.

By one approach the control circuit 101 can operably couple to an energy-based treatment platform 114 that is configured to deliver therapeutic energy 112 to a corresponding patient 104 having at least one treatment volume 105 and also one or more organs-at-risk (represented in FIG. 1 by a first through an Nth organ-at-risk 108 and 109) in accordance with the optimized energy-based treatment plan 113. These teachings are generally applicable for use with any of a wide variety of energy-based treatment platforms/apparatuses. In a typical application setting the energy-based treatment platform 114 will include an energy source such as a radiation source 115 of ionizing radiation 116.

By one approach this radiation source 115 can be selectively moved via a gantry along an arcuate pathway (where the pathway encompasses, at least to some extent, the patient themselves during administration of the treatment). The arcuate pathway may comprise a complete or nearly complete circle as desired. By one approach the control circuit 101 controls the movement of the radiation source 115 along that arcuate pathway, and may accordingly control when the radiation source 115 starts moving, stops moving, accelerates, de-accelerates, and/or a velocity at which the radiation source 115 travels along the arcuate pathway.

As one illustrative example, the radiation source 115 can comprise, for example, a radio-frequency (RF) linear particle accelerator-based (linac-based) x-ray source. A linac is a type of particle accelerator that greatly increases the kinetic energy of charged subatomic particles or ions by subjecting the charged particles to a series of oscillating electric potentials along a linear beamline, which can be used to generate ionizing radiation (e.g., X-rays) 116 and high energy electrons.

A typical energy-based treatment platform 114 may also include one or more support apparatuses 110 (such as a couch) to support the patient 104 during the treatment session, one or more patient fixation apparatuses 111, a gantry or other movable mechanism to permit selective movement of the radiation source 115, and one or more energy-shaping apparatuses (for example, beam-shaping apparatuses 117 such as jaws, multi-leaf collimators, and so forth) to provide selective energy shaping and/or energy modulation as desired.

In a typical application setting, it is presumed herein that the patient support apparatus 110 is selectively controllable to move in any direction (i.e., any X, Y, or Z direction) during an energy-based treatment session by the control circuit 101. As the foregoing elements and systems are well understood in the art, further elaboration in these regards is not provided here except where otherwise relevant to the description.

Figure 2:
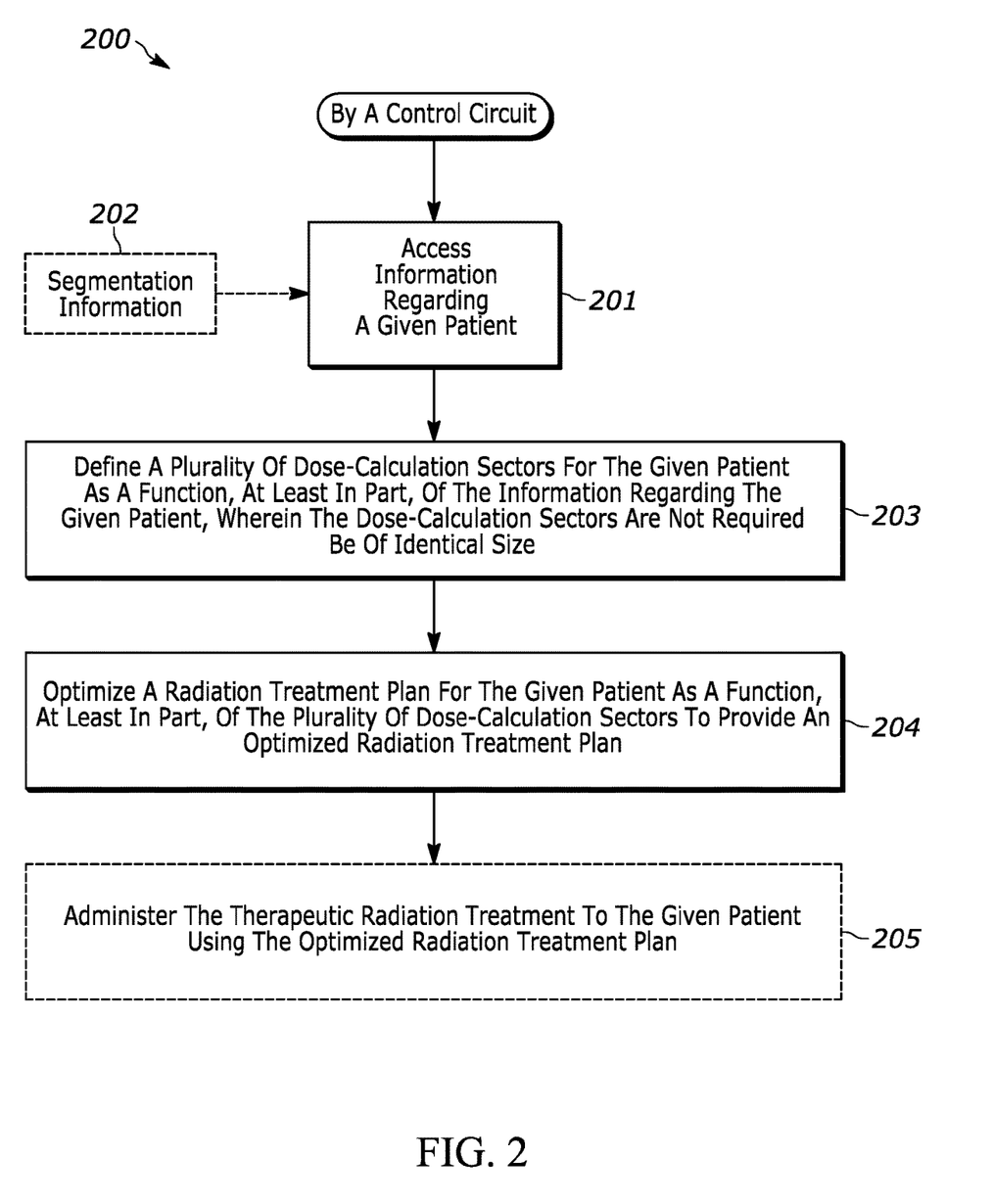
FIG. 2 comprises a flow diagram as configured in accordance with various embodiments of these teachings.

Referring now to FIG. 2, a process 200 that can be carried out, for example, in conjunction with the above-described application setting (and more particularly via the aforementioned control circuit 101) will be described. Generally speaking, this process 200 serves to facilitate generating an optimized radiation treatment plan 113 to thereby facilitate treating a particular patient with therapeutic radiation using a particular radiation treatment platform per that optimized radiation treatment plan.

At block 201, this process 200 accesses information regarding the given patient. This information can include, for example, computed tomography scans of the patient. By one approach, this information can include segmentation information 202 that depicts at least one treatment volume (such as a tumor) and at least one organ-at-risk. (Segmentation comprises a well-understood area of prior art endeavor. Accordingly, no further details are provided here in those regards for the sake of brevity.)

At block 203, this process 200 then provides for defining a plurality of dose-calculation sectors for the given patient as a function, at least in part, of the foregoing information regarding the given patient.

Optimization can be based upon sub-dividing the control point sequences of the corresponding arc field (or any other field that defines axis movement, or combination of axis movement over a range of values) into smaller sectors. These optimization sectors are often called "dose-calculation sectors" in the art, and they aid in subdividing the optimization problem into smaller pieces for performance. Typically, these optimization sectors do not overlap each other, though in some optimization techniques overlapping sectors can be used to help keep the sub-sectors within the axis' movement limits. The expression refers to the fact that the dose contribution from each sector can be approximated by using only one dose calculation direction within a corresponding sector. To that end, each dose-calculation sector can have one position assigned for dose calculation and gradient back-projection. This single position can be a single control point that belongs to the sector.

Figure 3:
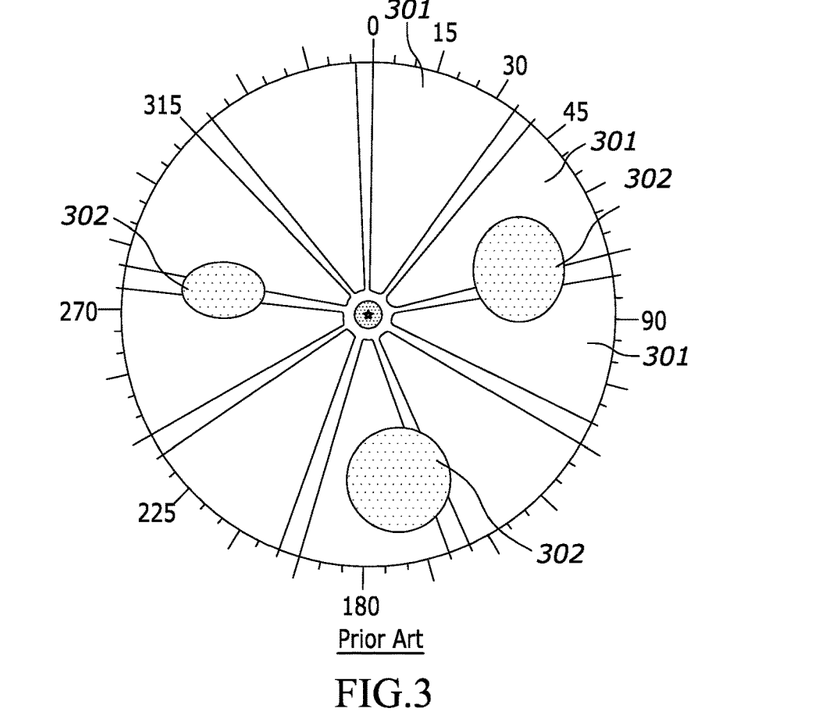
FIG. 3 comprises a schematic representation as configured in accordance with the prior art.

Referring momentarily to FIG. 3, a typical prior art approach to defining dose-calculation sectors requires that the dose-calculation sectors all are uniformly sized. In this illustrative example for arc treatment having one target at the center, the control points sample the angular space every 5 degrees, from 0 until 355, resulting in a total of 72 control points.

In this illustrative prior art example, there are nine equally-sized dose-calculation sectors (some of which are denoted by reference numeral 301). The number of dose-calculation sectors can vary, but the dose-calculation sectors will nevertheless be equally sized.

In this illustrative example, the patient presents three separate organs-at-risk 302. It can be seen in this illustrative prior art example that these organs-at-risk 302 can each overlap with two (or more) dose-calculation sectors 301. In particular, the equally-sized dose-calculation sectors each comprise, by a specified requirement, 8 control points. It can be seen that six out of the nine dose-calculation sectors cluster together control points that have an obstructed view to the target (where an organ-at-risk constitutes the corresponding obstruction).

Figure 4:
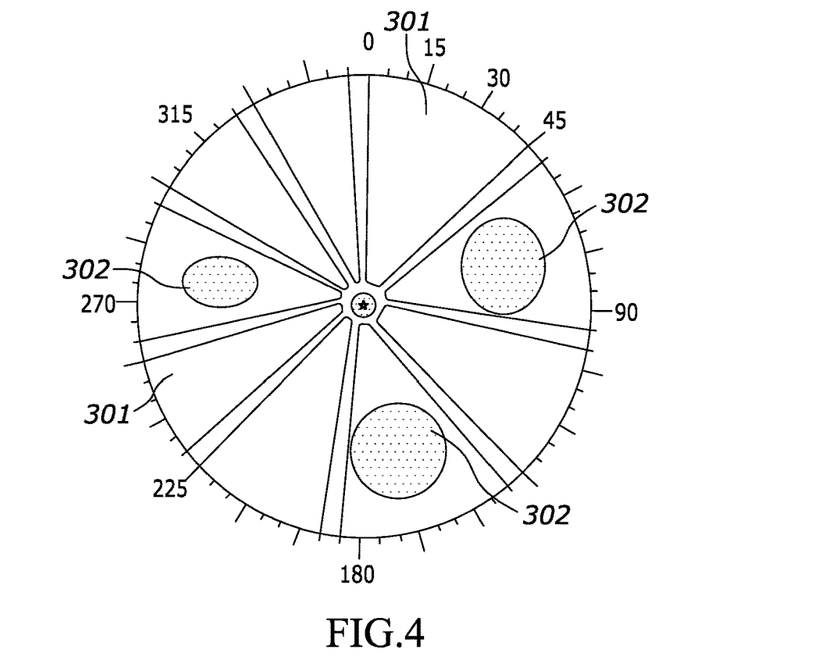
FIG. 4 comprises a schematic representation as configured in accordance with various embodiments of these teachings.

Referring again to FIG. 2, at block 203 the dose-calculation sectors are defined in a way that does not require that each of these dose-calculation sectors be of identical size to one another. It may happen that two or more dose-calculation sectors do end up having the same size, but such a result is not required as it is in the prior art. FIG. 4 presents one illustrative example in these regards, where the same presentation of organs-at-risk 302 prevails as in the aforementioned example, but here at least some of the dose-calculation sectors 301 are differently-sized as compared to one another. In particular, and as illustrated, the dose-calculation sectors 301 are defined so that each organ-at-risk 302 is at least substantially wholly contained within a single one of the dose-calculation sectors 301. (As used in this context, the expression "substantially" shall be understood to mean at least 85%, or 90%, or 95%, or 98%, or 99% as desired and as may be appropriate to the given application setting.)

By one approach, defining the plurality of dose-calculation sectors for the given patient comprises, at least in part, defining only two types of dose-calculation sectors. In particular, a first type of dose-calculation sector that wholly contains at least one organ-at-risk and a second type of dose-calculation sector that does not contain any part of any organ-at-risk. This approach can result in defining at least one of the second type of dose-calculation sectors between any two otherwise adjacent ones of the first type of dose-calculation sectors.

By one approach, at least one of the defined dose-calculation sectors is purposefully-sized such that the dose-calculation sector is right-sized to accommodate an organ-at-risk. As used herein, the expression "right-sized" refers to the sides of the dose-calculation sector being sized just large enough to accommodate the organ-at-risk with little or no margin (such as a margin of 0°, 0.25°, 0.5°, 1.0°, 2.0°, 5.0°, and so forth as appropriate to suit the needs of a given application setting).

As will be exemplified in more detail below, by one approach the defined dose-calculation sectors may be allowed to range from a specified minimum number of control points (such as, but not limited to, 4 control points, 5 control points, or 6 control points) to a specified maximum number of control points (such as, but not limited to, 9 control points, 10 control points, or 11 control points) as desired. Also as exemplified in more detail below, by one approach defining the plurality of dose-calculation sectors for the given patient can comprise, at least in part, sizing at least some of the dose-calculation sectors as a function of at least one complexity metric such that the defined dose-calculation sectors correspond to reduced optimization complexity. (As one illustrative example in these regards, these teachings will accommodate defining the sectors as a function of mechanical axis-movements in the input field. This might comprise, for example, starting a field as an arc field, then stopping the gantry at some point, and then continuing as an arc field to the end. The sector division contemplated herein could then take into account the fact that the gantry stops (once or more often per field) and add sector boundaries accordingly.)

At block 204, this process 200 provides for optimizing a radiation treatment plan (such as, but not limited to, a volumetric modulated art therapy radiation treatment plan) as a function, at least in part, of the plurality of dose-calculation sectors to thereby provide an optimized radiation treatment plan 113. As illustrated at optional block 205, these teachings will further accommodate administering therapeutic radiation to the given patient using the optimized radiation treatment plan 113 via the aforementioned radiation treatment platform 114.

These teachings are highly flexible in practice and will accommodate various modifications and/or supplemental features. Further details will now be provided regarding the foregoing. It will be understood that these details are intended to serve an illustrative purpose and are not intended to suggest any particular limitations with respect to the practice of these teachings.

The following description pertains to an approach to provide for an optimal partition of sequences.

Given an input interval/=[A, B], a number of segments k, and a cost function $f: I^2 \rightarrow R$, the optimal sequence partition (or sequence segmentation) problem consists of finding pivots (i.e., sector boundaries) $p_1, p_2, \ldots, p_{k+1}$ such that:

$$p_i < p_{i+1} \; \forall i, \; p_1 = A, \; p_{k+1} = B, \text{ and} \qquad 1)$$

$$\sum_{i=1}^{k} f(p_i, p_{i+1}) \leq \sum_{i=1}^{k} f(\overline{p}_i, \overline{p}_{i+1}) \; \forall \overline{p}_1 = A < \overline{p}_2 < \ldots < \overline{p}_{k+1} = B \qquad 2)$$

where equation 1 states that the set of pivots effectively partition the input interval into k consecutive subintervals, and equation 2 states that the set of pivots minimizes the total of the cost functions applied to all the subintervals induced by the pivots. This approach has a known solution by dynamic programming that runs in time O(kN^2) where N=B−A is the size of the input interval and k is the requested number of partitions.

If some overlap margin m is desired between the sectors, this can be included in the optimization process by modifying equation 2) as follows:

$$\sum_{i=1}^{k} f(p_i - m, p_{i+1} + m) \leq \sum_{i=1}^{k} f(\overline{p}_i - m, \overline{p}_{i+1} + m) \qquad 2')$$

$$\forall \overline{p}_1 = A < \overline{p}_2 < \ldots < \overline{p}_{k+1} = B$$

With the foregoing in mind, the present teachings can provide an approach to optimizing dose-calculation sectors that considers the sequence of control points as the interval [A,B] and that utilizes a function $f( \; )$ that models how convenient it is for the optimization process to cluster certain group of contiguous control points into a dose-calculation sector.

Note that a simple function that applies a quadratic cost on the size of a group, such as:

$$f(x, y) = (y - x)^2$$

would produce equal-sized intervals, hence capturing the solution of the prior art.

The present teachings will instead accommodate the design of a cost function $f$ that identifies what kind of intervals are favorable to the optimization scheme. Some possible strategies for the cost function will now be considered.

By one approach, instead of "equal sized"-intervals, the partition could aim for a balanced distribution of some other quantity that correlates with the amount of work/difficulty/complexity that is associated with the resultant sectors. This approach may consider, for example, that the more the target and organ-at-risk projections overlap in the multi-leaf collimator plane of a certain control point, the greater the resultant complexity for that control point.

By another approach, in lieu of the foregoing or in combination therewith, a control point within an avoidance sector (for example, a user-set span of gantry directions where the technician wants to totally block the radiation) can be treated as signaling lower complexity.

By one approach, these teachings can serve to favor homogeneous dose-calculation sectors. In this case, for example, all of the control points in a same dose-calculation sector will be treated as one in a projection/radiation direction sense. Therefore, to achieve better results, the control points in the same dose-calculation sector should be as homogeneous as possible. For instance, in the ideal scenario, the set of organs-at-risk that overlap with the target (or whose projections overlap in a multi-leaf collimator plane) should be the same for all the control points in a given dose-calculation sector.

If desired, these teachings will accommodate having the cost function can either depend only on quantities that are not related to the actual optimization result (e.g., target and organ-at-risk projections) and which can be evaluated at the beginning of the optimization process, or they can depend also on a current solution (e.g., the current leaf sequence and/or target fluences) and thus its value can change over the course of optimization. In the latter case it may be beneficial to re-define the dose-calculation sectors periodically during the optimization process.

The following description pertain to an illustrative approach to the optimal partitioning of a control points sequence for balanced workload.

$$f(x, y) = \left(\sum_{i=x}^{y} C(i)\right)^2 f$$

This illustrative example presumes a defined function C(i) that captures a complexity (understood as "difficulty for the optimizer") for the i-th control point. Then a function can serve to partition the input into intervals that have a similar complexity. In addition to that, can be defined piecewise to prevent too small or too large intervals, and other constraints can be easily incorporated in its formulation. In this way, in lower complexity areas, there may be somewhat larger dose-calculation sectors, while in higher complexity areas the dose-calculation sectors may be relatively smaller.

$$f(x, y) = \left(\sum_{i=x}^{y} C(i)\right)^2 f$$

In this way, the optimizer can make more efficient use of the iterations of the optimization process, by spending more resources exploring the high complexity areas.

By way of a more specific illustrative example, let it be assumed an input consisting of 32 control points, associated with the interval [0,31]. Then consider:

$$C(i) = \begin{cases} 0.0 & i \in \{20, 21, 22, 23\} \\ 0.5 & i \in \{3, 4, 5, 6, 7, 8, 9\} \\ 1.0 & \text{otherwise} \end{cases}$$

Such a function serves as a representation of a scenario where control points in the range from 20 to 23 have an avoidance sector in them, where hence the complexity is zero. Control points in the range from 3 to 9 have only one overlapping organ-at-risk with the target, while the remaining control points have two overlapping organs-at-risk with the target (hence their complexity is double the former group).

$$f(x, y) = \left(\sum\nolimits_{i=x}^{y} C(i)\right)^2$$

Upon using the foregoing with the cost function the resulting partition is as follows:

[0,8] [9,15] [16,25] [26,31]

It can be seen that the resultant lengths of the intervals are different (9, 7, 10, 6), but the sum of its C values is as balanced as possible (6, 6.5, 6, 6).

By one approach, a cost function that would favor homogeneous DCS can be expressed as follows:

$$f(x, y) = \left(\sum\nolimits_{i=x+1}^{y} \sigma(C(i) - C(i-1))\right)^2$$

$$\sigma(x) = \begin{cases} 0, & x = 0 \\ 1, & \text{otherwise} \end{cases}$$

where

Pursuant to this approach, a penalty is added each time there is a change in the set of organs that overlap with the target in a given dose-calculation sector. A more general formulation for homogenous dose-calculation sectors would be, given some function S(i) that computes a similarity-based distance between two control points i and j:

$$f(x, y) = \left(\sum_{i=x+1}^{y} S(i, (x+y)/2)\right)^2$$

In this case, the cost of an interval is the squared sum of the similarity between each control point (represented by the index i in the equation) and the control point in the center of the interval (represented by the index (x+y)/2). It may be noted that, here, S(i,j) could be the pixelwise distance between the whole projection of the targets and organs-at-risk into each control point beam's eye view.

If desired, the algorithm of previous sections can be extended naturally to generate a multi resolution-scheme by applying the optimal segmentation approach described above to the input control point sequence to generate the dose-calculation sectors of a first multi-resolution level and then optimizing the leaves, monitor units, and so forth of the current dose-calculation sectors. The optimal segmentation approach can then be applied to the subsequence belonging to each dose-calculation sector obtained in the previous iteration, thereby generating the dose-calculation sectors of a next multi-resolution level. These steps can be repeated for a desired number of multi-resolution levels, in which all dose-calculation sectors are comprised of two control points.

If desired, the cost function at some, or each, level can be slightly different, to optimize the partition according to different goals, and to incorporate specific constraints for each level. Moreover, in this iterative process it is also possible to incorporate information of the current candidate solution into the metric that will be used to create the dose-calculation sectors. This information might include leaf positions, monitor units, calculated dose, and so forth. Also if desired, the total amount of control points in an arc field can be changed during the optimization by either adding or removing control points in between the previous control points. After this operation, the sequencing can be refined to match the current situation.

Figure 5:
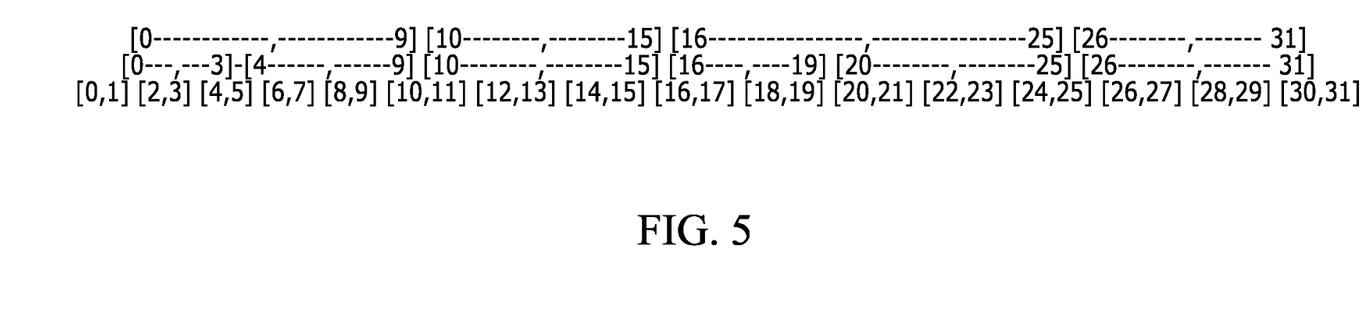
FIG. 5 presents a partition example in accordance with various embodiments of these teachings.

As another illustrative example, and presuming the same input as was described above, one can use these proposed approaches to calculate a 3 level multi resolution partition. In addition to the basic cost function, one can incorporate constraints as follows. In all levels, the intervals are constrained to be of even size. In Level 1, the intervals are constrained to be of size 6 or bigger. In Level 2, the intervals are constrained to be of size 4 or bigger. And in Level 3, the intervals are constrained to be of size 2 or bigger. The foregoing would result in the segmentation illustrated in FIG. 5.

Due to the adaptive nature of these teachings, these teachings can be also be applied for sequences of control points that exhibit more complexity than one typically finds in traditional volumetric modulated arc therapy radiation treatment plans. Two examples in these regards will now be presented.

This first example presumes a non-uniform distribution of control points.

When there is an input sequence of control points where the density of control points is not uniform, for example, by having a higher density of control points around some specific angles, these teachings would serve to create dose calculation sectors in such a way that these control points are clustered together. This result should occur because the cost of putting these points together will be lower than the cost of clustering them with points that are further away.

This second example presumes a sequence of control points in conjunction with an application setting having a dynamic patient support apparatus and/or a dynamic collimator apparatus.

The present teachings will gracefully accommodate such an application setting because if there are changes in multiple axis (owing, for example, to dynamic settings as regards the gantry, couch, collimator, and so forth), the cost function will naturally be higher, because the projections to the beam's eye view will be changing more rapidly, as compared to the case where the variation occurs in only one axis (as in, just the gantry when used with a static couch and collimator).

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method to facilitate providing therapeutic radiation treatment to a given patient, the method comprising:
by a control circuit:
accessing information regarding the given patient;
defining a plurality of dose-calculation sectors for the given patient as a function, at least in part, of the information regarding the given patient, wherein the dose-calculation sectors are not required to be uniformly sized;
optimizing a radiation treatment plan for the given patient as a function, at least in part, of the plurality of dose-calculation sectors to provide an optimized radiation treatment plan.

2. The method of claim 1 wherein the information regarding the given patient includes segmentation information that depicts at least one treatment volume.

3. The method of claim 2 wherein defining the plurality of dose-calculation sectors for the given patient comprises, at least in part, defining the dose-calculation sectors such that each organ-at-risk is at least substantially wholly contained within a single one of the dose-calculation sectors.

4. The method of claim 3 wherein defining the plurality of dose-calculation sectors for the given patient comprises, at least in part, sizing at least some of the plurality of dose-calculation sectors that contain a corresponding organ-at-risk to be right-sized to accommodate that corresponding organ-at-risk.

5. The method of claim 2 wherein defining the plurality of dose-calculation sectors for the given patient comprises, at least in part, defining only two types of dose-calculation sectors, comprising a first type of dose-calculation sector that wholly contains at least one organ-at-risk and a second type of dose-calculation sector that does not contain any part of any organ-at-risk.

6. The method of claim 5 wherein defining the plurality of dose-calculation sectors for the given patient comprises, at least in part, defining at least one of the second type of dose-calculation sectors between any two otherwise adjacent ones of the first type of dose-calculation sectors.

7. The method of claim 1 wherein defining the plurality of dose-calculation sectors for the given patient comprises, at least in part, sizing at least some of the dose-calculation sectors as a function of at least one complexity metric such that defined dose-calculation sectors correspond to reduced optimization complexity.

8. The method of claim 1 wherein defining the plurality of dose-calculation sectors for the given patient comprises, at least in part, allowing a given dose-calculation sector to range from a specified minimum number of control points to a specified maximum number of control points.

9. The method of claim 1 wherein the therapeutic radiation treatment comprises a volumetric modulated arc therapy radiation treatment.

10. The method of claim 1 further comprising administering the therapeutic radiation treatment to the given patient using the optimized radiation treatment plan.

11. An apparatus to facilitate providing therapeutic radiation treatment to a given patient, the apparatus comprising:
a memory having information regarding the given patient stored therein;
a control circuit operably coupled to the memory and configured to:
access the information regarding the given patient in the memory;
define a plurality of dose-calculation sectors for the given patient as a function, at least in part, of the information regarding the given patient, wherein the dose-calculation sectors are not required to be uniformly sized;
optimize a radiation treatment plan for the given patient as a function, at least in part, of the plurality of dose-calculation sectors to provide an optimized radiation treatment plan.

12. The apparatus of claim 11 wherein the information regarding the given patient includes segmentation information that depicts at least one treatment volume and at least one organ-at-risk.

13. The apparatus of claim 12 wherein the control circuit is configured to define the plurality of dose-calculation sectors for the given patient by, at least in part, defining the dose-calculation sectors such that each organ-at-risk is at least substantially wholly contained within a single one of the dose-calculation sectors.

14. The apparatus of claim 13 wherein the control circuit is configured to define the plurality of dose-calculation sectors for the given patient by, at least in part, sizing at least some of the plurality of dose-calculation sectors that contain a corresponding organ-at-risk to be right-sized to accommodate that corresponding organ-at-risk.

15. The apparatus of claim 12 wherein the control circuit is configured to define the plurality of dose-calculation sectors for the given patient by, at least in part, defining only two types of dose-calculation sectors, comprising a first type of dose-calculation sector that wholly contains at least one organ-at-risk and a second type of dose-calculation sector that does not contain any part of any organ-at-risk.

16. The apparatus of claim 15 wherein the control circuit is configured to define the plurality of dose-calculation sectors for the given patient by, at least in part, defining at least one of the second type of dose-calculation sectors between any two otherwise adjacent ones of the first type of dose-calculation sectors.

17. The apparatus of claim 11 wherein the control circuit is configured to define the plurality of dose-calculation sectors for the given patient by, at least in part, sizing at least some of the dose-calculation sectors as a function of at least one complexity metric such that defined dose-calculation sectors correspond to reduced optimization complexity.

18. The apparatus of claim 11 wherein the control circuit is configured to define the plurality of dose-calculation sectors for the given patient by, at least in part, allowing a given dose-calculation sector to range from a specified minimum number of control points to a specified maximum number of control points.

19. The apparatus of claim 11 wherein the therapeutic radiation treatment comprises a volumetric modulated arc therapy radiation treatment.

20. The apparatus of claim 11 wherein the control circuit is further configured to: facilitate administering the therapeutic radiation treatment to the given patient using the optimized radiation treatment plan.

* * * * *